United States Patent Office 3,430,138
Patented Feb. 25, 1969

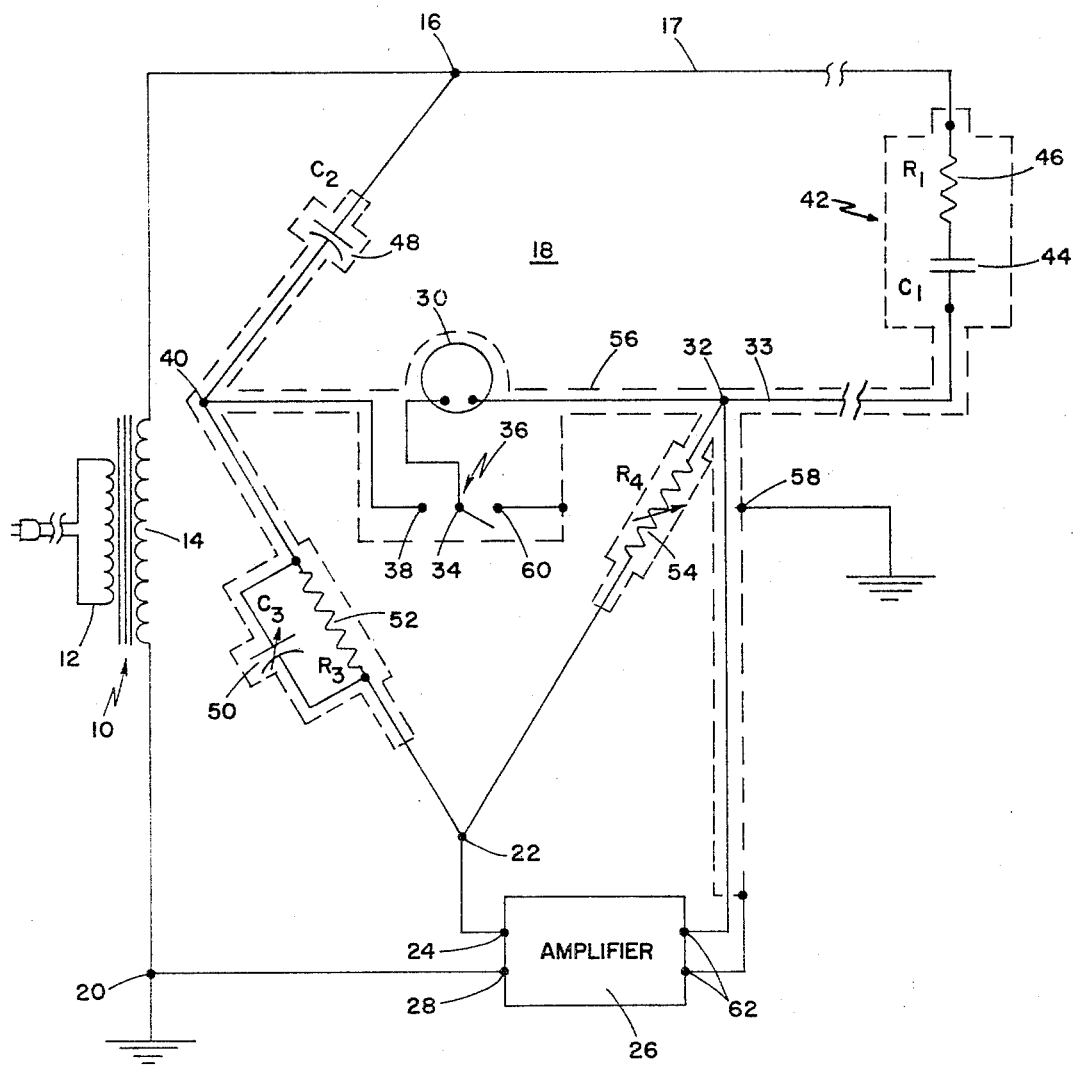

3,430,138
AUTOMATIC GUARD BALANCE
Edmund H. Povey, Medford, Mass., assignor to Doble Engineering Company, Belmont, Mass., a corporation of Massachusetts
Filed Sept. 20, 1966, Ser. No. 580,713
U.S. Cl. 324—57                     5 Claims
Int. Cl. G01r 27/02

This invention relates to automatic guard balance systems for alternating current bridges.

Alternating current bridges are used to measure electrical components using very small current and voltage values. Electrical charges from external sources or from neighboring portions of the bridge may produce unwanted currents in the bridge through stray capacitances, thereby introducing errors into the measurements. A guard placed around portions of the bridge and grounded at one point, usually at the grounded one of the power input terminals, shields the bridge and eliminates such errors. But the guard itself introduces a source of error in that it provides a second path, coupled to the bridge by stray capacitances, between the shield and the associated portion of the bridge whereby portions of the current being measured are not sensed by the bridge. This is of particular significance in configurations where the component to be tested is remote from the rest of the bridge and is connected to it by long leads. One solution has been to balance the voltage level of the guard with that of the long leads connected to the component to be tested. Such a system is not preferred when high voltages are applied to the bridge because of the danger to personnel if a fault should occur in the specimen, causing applied high voltage to appear on the guard shielding. Another solution is to manually adjust the voltage level of the bridge with that of the guard. This method is not preferred as the system must be frequently readjusted by the operator because of changes in the temperature or position of the long leads and test component.

It is, therefore, a primary object of this invention to provide a grounded guard balancing system which continually and automatically adjusts to conditions of the test component, the leads, and the remainder of the bridge to maintain the voltage level of the bridge at that of the guard, simply and inexpensively.

The invention features apparatus for testing electrical components including a guard balance system. An alternating current bridge having four arms defines two pairs of terminals; one of the arms having leads adapted to connect to a component to be tested. A detector is connected between a first pair of the terminals; the second pair of the terminals is connected to a power supply having one output terminal grounded and to the guard balance system. The guard balance system includes a grounded guard for shielding the bridge and a negative feedback amplifier having its input connected between the guard and one of the first pair of bridge terminals, and having its output circuit connected between one of the second pair of bridge terminals and the ground of the power supply. The amplifier generates a correction voltage of inverted phase to maintain the voltage balance between the lead connecting the component to be tested to one of the first pair of terminals and the guard at ground.

Other objects, features, and advantages will appear from the following description of a preferred embodiment of the invention, taken together with the attached drawing thereof showing a schematic diagram of an alternating current bridge with the guard balance system of the invention.

There is shown in the drawing a transformer 10 having a primary 12 for connection to 110 volts A.C. source and having a secondary 14, delivering a voltage of 2500 volts A.C., connected to input terminal 16 of bridge 18 and to ground at terminal 20. Input terminal 22 of bridge 18 is connected to an output terminal 24 of negative feedback amplifier 26. Output terminal 28 of amplifier 26 connects ground to terminal 20.

A voltmeter 30 is connected between terminal 32 of bridge 18 and the movable contact 34 of single-pole, double-throw switch 36. A stationary contact 38 of switch 36 is connected to terminal 40 of bridge 18.

Component 42 is the test specimen represented by a capacitor 44 and resistor 46 having equivalent capacitance $C_1$ and resistance $R_1$, respectively, and is connected to contacts 16 and 32 by long leads 17 and 33, respectively. Component 42 may be a capacitor having as one electrode a metal cup containing a transformer oil whose impedance and power factor is to be tested and having as the other electrode a metal element emersed in the oil. Capacitor 48, having capacitance $C_2$ is connected to terminals 16 and 40 of bridge 18. It is a high grade, no-loss capacitor of 160 mmf.; a 40 mmf.–200 mmf. variable transmitting capacitor may be used. Connected in parallel between terminals 40 and 22 are a variable capacitor 50 of capacitance $C_3$ and a resistor 52 of resistance $R_3$. Connected between terminals 32 and 22 is an essentially zero-phase-angle, variable resistor 54 of resistance $R_4$. Capacitor 50 for balancing the power factor is variable from 0–5000 mmf. and resistors 52 and 54 are 5000Ω.

Guard 56 shields terminals 32 and 40 and all components and leads therebetween except amplifier 26, and is grounded at point 58 near terminal 32. The second stationary contact 60 of switch 36 is connected to guard 56. Amplifier 26 is shown without guard 56 because its housing accomplishes the necessary shielding. Guard 56 ends beyond component 42 and capacitor 48 so that the remainder of the connection to terminal 16 from component 48 and long lead 17 are unshielded. Further shielding is unnecessary, for leakage currents only affect the accuracy of the bridge in so far as they alter the value of current passing between capacitor 48 and capacitor 50 and resistor 52, or between component 42 and resistor 54.

Amplifier 26 receives a continuous signal representative of the potential difference between terminal 32, thus terminal 40 when the bridge is balanced and guard 56 at its input terminals 62. The resultant output signal is inverted in phase and is increased in magnitude compared to the voltage of the input signal. For example, with 2500 volts across terminals 16 and 20 there is a 2499 volts drop from terminal 16 to terminal 32 and 40; terminals 32 and 40 are at 1 volt with respect to guard 56; the voltage of the lower half of the bridge is then 0.04% of the total voltage applied. To bring terminals 32 and 40 to guard ground −1.0 volt must be applied to terminal 22 bringing the total voltage across terminal 16 and 20 to 2501 volts. Therefore amplifier 26 must present a voltage to terminal 22 of 0.04% of 2501 volts or +1.0004 volts. The phase inversion provided by amplifier 26 assures that the polarity of the offsetting voltage applied to terminal 22 will always be opposite to the polarity of the potential difference between terminal 32 and guard 56. In this manner the effect of the capacitance between lead 33 and guard 56 and the resulting error current are eliminated. For simplicity, in this example, considerations of the phase differences between the voltages across various components have been neglected.

In operation transfer contact 34 is engaged with contact 38 so that voltmeter 30 measures the potential difference between terminals 40 and 32. Capacitor 50 and resistor 54 are varied simultaneously to eliminate any potential difference between terminals 40 and 32. When the difference is zero, the bridge is balanced. The balance of the bridge is true and accurate because error currents which would otherwise leak to ground from lead 33 through guard 56 are prevented by the constant balance of voltages of lead 33 and guard by amplifier 26.

With the bridge balanced, the value of $R_1$ 46 and $C_1$ 44 may be calculated:

$$R_1 = \frac{C_3}{C_2} \cdot R_3$$

$$C_1 = \frac{R_3}{R_4} \cdot C_2$$

The power factor of the specimen may be read directly from capacitor 50 if it is so calibrated or it may be calculated:

$$\tan \delta = 2\pi f R_3 C_3$$

where $\tan \delta$ is the power factor and $f$ is the frequency. The power factor is actually the sine of $\delta$ but below 10° the difference in the values for sine and tangent are negligible and the power factors involved in oil testing are usually less than 5°.

Other embodiments will occur to those skilled in the art and are within the following claims:

What is claimed is:

1. Apparatus for testing electrical components including a guard balance system comprising:

an alternating current bridge having four arms connected to define two pairs of terminals, one of said arms having leads adapted to connect to a component to be tested, a detector connected between a first pair of said terminals, one of said second pair of said terminals being connected to a power supply having one output terminal grounded.

said guard balance system including a grounded guard for shielding said bridge and said detector, and a negative feed back amplifier having its input circuit connected between said guard and one of said first pair of said terminals, and having its output circuit connected between the other of said second pair of said terminals and said grounded terminal of said power supply, said amplifier generating a correction voltage of inverted phase to maintain the voltage balance between the lead connecting the component to be tested to one of said first pair of terminals and said guard at ground.

2. The apparatus of claim 1 in which each of the two of said arms connected to said amplifier output circuit contains an adjustable impedance, and a first of the two of said arms connected to said power supply contains a standard impedance and the second of said arms connected to said power supply is adapted to contain said component to be tested.

3. The apparatus of claim 2 in which said component to be tested is remote from said bridge and is connected to said bridge by long leads, one of which is shielded.

4. The apparatus of claim 2 in which the portions of said first and said second arms connected to said power supply are unshielded from said power supply to said standard impedance, and to said component to be tested respectively.

5. The apparatus of claim 1 in which said detector includes a voltage indicator, and a switch, said indicator being connected to one of said first pair of terminals and to a transfer contact of said switch being connected to said guard, said indicator measuring the voltage balance between said first pair of terminals when said transfer and said first contact are engaged, and between said first pair of terminals and said guard when said transfer and said second contact are engaged.

References Cited

UNITED STATES PATENTS 2,704,826   3/1955   Wiegand _____ 324—57 X
3,287,208   6/1968   Foley _____ 324—60

RUDOLPH V. ROLINEC, *Primary Examiner.*

E. E. KUBASIEWICZ, *Assistant Examiner.*

U.S. Cl. X.R.

324—123